United States Patent
Riddle

(10) Patent No.: US 10,534,969 B2
(45) Date of Patent: Jan. 14, 2020

(54) SYSTEMS AND METHODS FOR PROVIDING ILLUMINATION FOR IRIS BIOMETRIC ACQUISITION

(71) Applicant: EyeLock LLC, New York, NY (US)

(72) Inventor: George Herbert Needham Riddle, Princeton, NJ (US)

(73) Assignee: EYELOCK LLC, New York, NY (US)

( * ) Notice: Subject to any disclaimer, the term of this patent is extended or adjusted under 35 U.S.C. 154(b) by 142 days.

(21) Appl. No.: 15/902,447

(22) Filed: Feb. 22, 2018

(65) Prior Publication Data

US 2018/0247146 A1 Aug. 30, 2018

Related U.S. Application Data

(60) Provisional application No. 62/463,091, filed on Feb. 24, 2017.

(51) Int. Cl.
*G06K 9/20* (2006.01)
*G06K 9/00* (2006.01)
(Continued)

(52) U.S. Cl.
CPC ....... *G06K 9/2027* (2013.01); *G06K 9/00597* (2013.01); *G06K 9/2036* (2013.01); *G06K 9/4661* (2013.01); *H04N 5/2256* (2013.01)

(58) Field of Classification Search
CPC ............. G06K 9/00597; G06K 9/2036; G06K 9/4661; H04N 5/2256
See application file for complete search history.

(56) References Cited

U.S. PATENT DOCUMENTS

| | | | |
|---|---|---|---|
| 4,641,349 A | 2/1987 | Flom et al. | |
| 5,259,040 A | 11/1993 | Hanna | |

(Continued)

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

B. Galvin, et al., Recovering Motion Fields: An Evaluation of Eight Optical Flow Algorithms, Proc. of the British Machine Vision Conf. (1998) (pp. 195-204).

(Continued)

*Primary Examiner* — Edward Park
(74) *Attorney, Agent, or Firm* — Foley & Lardner LLP

(57) ABSTRACT

The present disclosure describes systems and methods for imaging an iris for biometric recognition. An image sensor may be located a distance L from an iris, to acquire an image of the iris. The image may have a contrast amplitude comprising modulation of a signal level at the image sensor due to features of the iris being acquired, and a standard deviation of said signal level due to noise generated within the image sensor. An illumination source may provide infrared illumination during acquisition of the image. When L is set at a value of at least 30 centimeters, the illumination source can provide the infrared illumination to the iris at a first irradiance value, quantified in watts per centimeter-squared, such that the contrast amplitude is at a value above that of the standard deviation, and enables the acquired image to be used for biometric recognition.

20 Claims, 11 Drawing Sheets

(51) Int. Cl.
*G06K 9/46* (2006.01)
*H04N 5/225* (2006.01)

(56) References Cited

U.S. PATENT DOCUMENTS

| | | | |
|---|---|---|---|
| 5,291,560 A | 3/1994 | Daugman |
| 5,488,675 A | 1/1996 | Hanna |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 2005/0084137 A1 | 4/2005 | Kim et al. |
| 2006/0074986 A1 | 4/2006 | Mallalieu et al. |
| 2007/0211922 A1 | 9/2007 | Crowley et al. |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0102748 A1* | 5/2011 | Shevlin ............ G02B 26/0833 353/38 |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0240223 A1 | 9/2012 | Tu |
| 2012/0257797 A1 | 10/2012 | Leyvand et al. |
| 2016/0000324 A1* | 1/2016 | Rege ................ A61B 3/0008 351/206 |

OTHER PUBLICATIONS

J. R. Bergen, et al., Hierarchical Model-Based Motion Estimation, European Conf. on Computer Vision (1993) (pp. 237-252).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition (1994)(pp. 1-5).

International Search Report and Written Opinion of PCT Appl. No. PCT/US2018/019168 dated May 24, 2018.

* cited by examiner

SYSTEMS AND METHODS FOR PROVIDING ILLUMINATION FOR IRIS BIOMETRIC ACQUISITION

CROSS REFERENCE TO RELATED APPLICATIONS

This application claims the benefit of and priority to U.S. Provisional Application Ser. No. 62/463,091, filed Feb. 24, 2017, entitled "SYSTEMS AND METHODS FOR PROVIDING ILLUMINATION FOR IRIS BIOMETRIC ACQUISITION". The entire content of the foregoing is incorporated herein by reference for all purposes.

FIELD OF THE DISCLOSURE

This disclosure generally relates to systems and methods for configuring illumination for biometric purposes, including but not limited to systems and methods for providing or controlling illumination for iris biometric acquisition.

BACKGROUND OF THE DISCLOSURE

Iris recognition is one of the most accurate and widely popular methods in biometric authentication. It is a contactless method that uses digital images of the detail-rich iris texture to create a genuine discrete biometric signature for the authentication. The images may be acquired by near infrared (NIR) light illumination of human eyes. Conventional handheld devices such as smartphone devices have built-in sensors and/or illuminators that are not designed for iris biometric acquisition. The small size of such devices, particularly the thinness characteristic of handheld devices like smartphones, can place constraints on critical optical components utilized for imaging.

SUMMARY OF THE DISCLOSURE

Described herein are systems and methods of for providing illumination for iris biometric acquisition. Limitations to conventional image sensor performance can restrict the working distance available for iris biometric acquisition. In supporting working distances that are more conducive for iris biometric acquisition, embodiments of the present systems and methods allow the modulation transfer function of an acquired iris image at biometric spatial frequencies to be below desired values and yet operate successfully, without modifying the characteristics of the lens or camera modules that are currently employed. Some embodiments of the present system may provide sufficient gain at the sensor for the contrast amplitude of the iris image to be greater than the standard deviation of the image signal level due to noise generated at the image sensor, even if the modulation transfer function of the acquired image is below recommended or desired values.

In one aspect, the present disclosure is directed to a system for imaging an iris for biometric recognition. The system may include an image sensor located a distance L from an iris, the image sensor configured to acquire an image of the iris, the image having a contrast amplitude comprising modulation of a signal level at the image sensor due to features of the iris being acquired, and a standard deviation of said signal level due to noise generated within the image sensor. An illumination source may provide infrared illumination during acquisition of the image. When L is set at a value of at least 30 centimeters, the illumination source can provide the infrared illumination to the iris at a first irradiance value, quantified in watts per centimeter-squared, such that the contrast amplitude is at a value above that of the standard deviation, and enables the acquired image to be used for biometric recognition.

The illumination source may provide the infrared illumination at irradiance values with a variation of less than 50% below a corresponding peak irradiance value, at distances out to 60 centimeters, over an illumination field of at least ±10 degrees. In some embodiments, the illumination source provides the infrared illumination at irradiance values with a variation of less than 50% below a corresponding peak irradiance value, at distances out to 60 centimeters, over an illumination field of at least ±23 degrees for example. The illumination source can provide the infrared illumination at irradiance values of at least 0.0015 watts per centimeter-squared at distances out to 60 centimeters. The illumination source may provide the infrared illumination at irradiance values of at least 0.0015 watts per centimeter-squared at distances out to 60 centimeters, over an area with at least a radius of 5 centimeters. The illumination source can for instance provide the infrared illumination at irradiance values of at least 0.0015 watts per centimeter-squared at distances out to 60 centimeters, over an area with at least a radius of 10 centimeters.

In certain embodiments, the illumination source includes a light emitting diode (LED). The image sensor and the illumination source may be incorporated on a user device. The standard deviation of said signal level may be due to shot noise generated within the image sensor. The first irradiance value is preconfigured or adjusted such that the contrast amplitude is at a value above that of the standard deviation.

In one aspect, the present disclosure is directed to a method for imaging an iris for biometric recognition. The method may include locating an image sensor a distance L from an iris, the image sensor configured to acquire an image of the iris. The image may have a contrast amplitude comprising modulation of a signal level at the image sensor due to features of the iris being acquired, and a standard deviation of said signal level due to noise generated within the image sensor. An illumination source may provide infrared illumination during acquisition of the image, wherein when L is set at a value of at least 30 centimeters, the illumination source is configured to provide the infrared illumination to the iris at a first irradiance value, quantified in watts per centimeter-squared, such that the contrast amplitude is at a value above that of the standard deviation, and enables the acquired image to be used for biometric recognition.

In some embodiments, the illumination source provides the infrared illumination at irradiance values with a variation of less than 50% below a corresponding peak irradiance value, at distances out to 60 centimeters, over an illumination field of at least ±23 degrees. The illumination source can provide infrared illumination at irradiance values with a variation of less than 50% below a corresponding peak irradiance value, at distances out to 60 centimeters, over an illumination field of at least ±10 degrees. The illumination source can provide infrared illumination at irradiance values of at least 0.0015 watts per centimeter-squared at distances out to 60 centimeters. The illumination source can provide infrared illumination at irradiance values of at least 0.0015 watts per centimeter-squared at distances out to 60 centimeters, over an area with at least a radius of 5 centimeters. The illumination source can provide infrared illumination at irradiance values of at least 0.0015 watts per centimeter-squared at distances out to 60 centimeters, over an area with at least a radius of 10 centimeters.

In some embodiments, the illumination source includes a light emitting diode (LED). The image sensor and the illumination source may be incorporated on a user device. The standard deviation of said signal level may be due to shot noise generated within the image sensor. The first irradiance value can be preconfigured or adjusted such that the contrast amplitude is at a value above that of the standard deviation.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
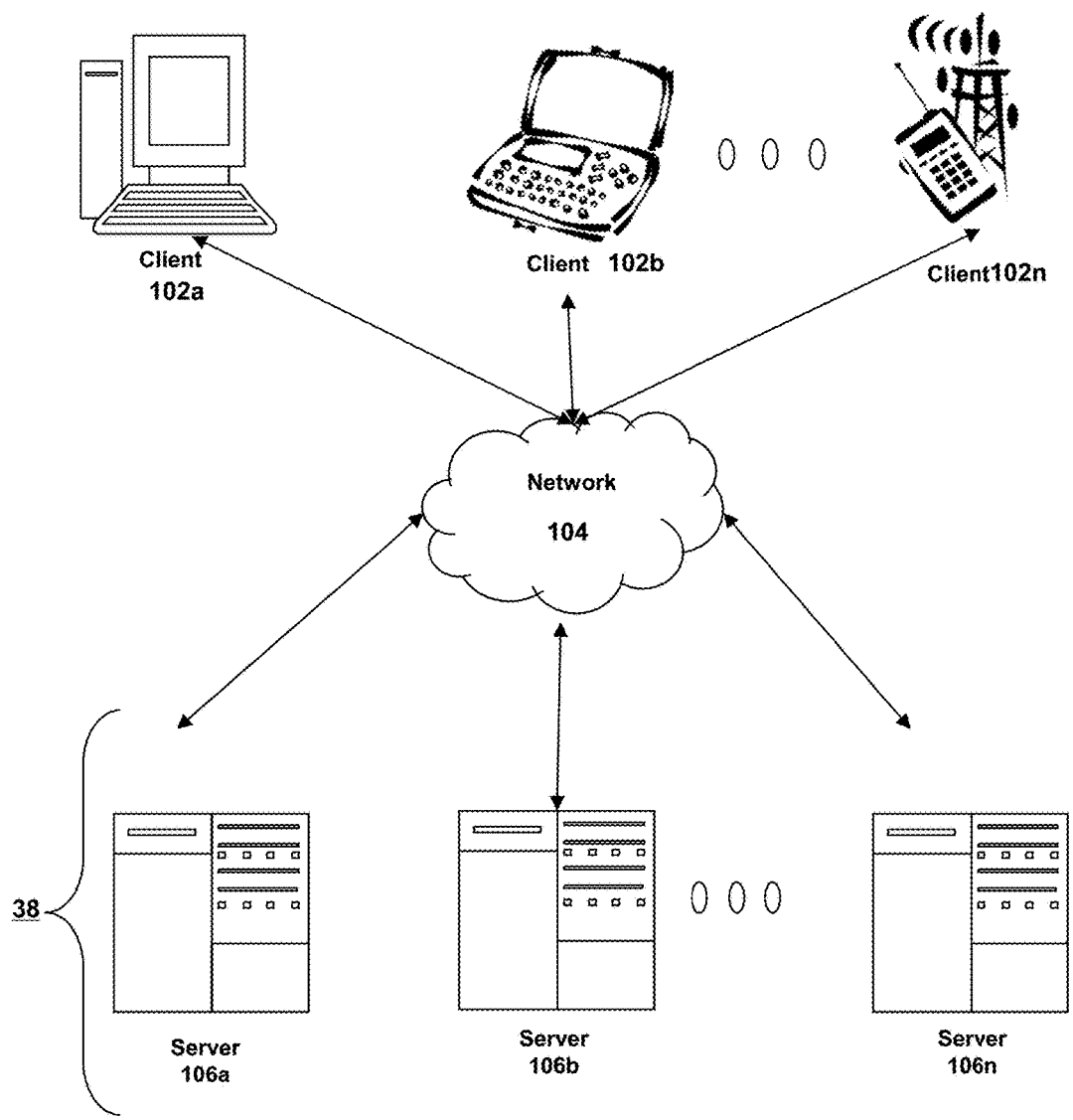
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for providing illumination for iris biometric acquisition.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 106b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
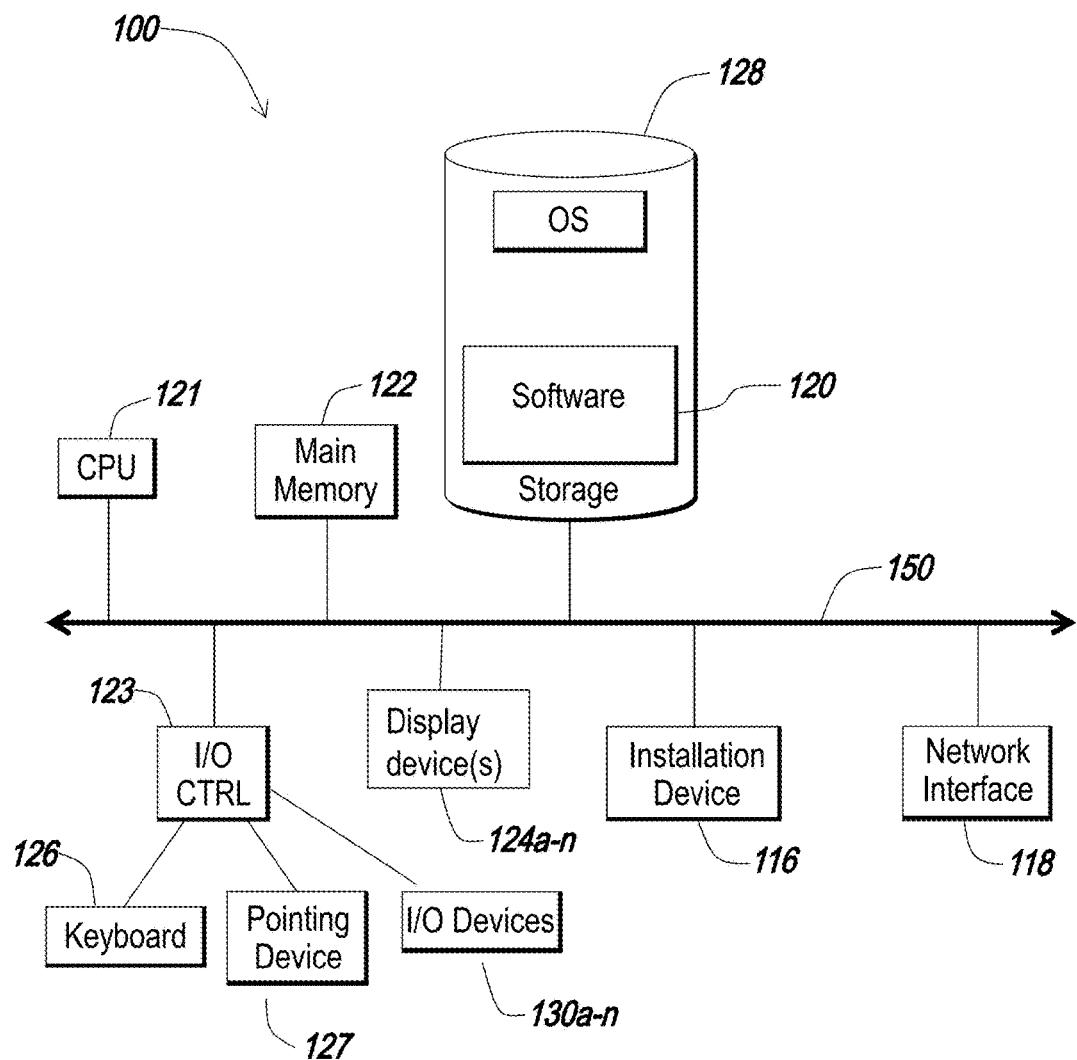
FIGS. 1B and 1C are block diagrams depicting embodiments of computing devices useful in connection with the methods and systems described herein.
Figure 1C:
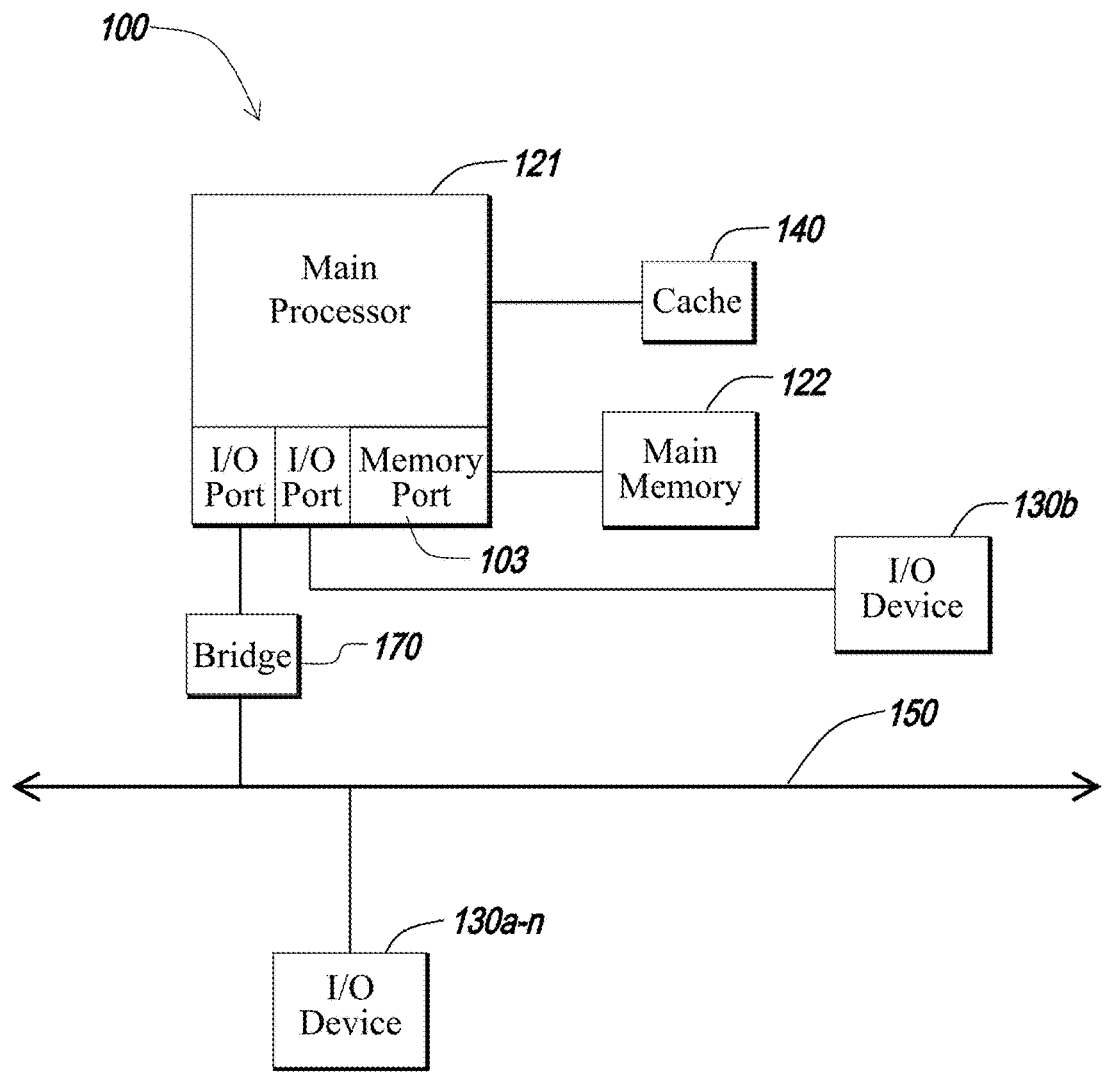

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 player. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

B. Providing Illumination for Iris Biometric Acquisition

Described herein are systems and methods for providing illumination for iris biometric capture. Limitations to conventional image sensor performance can restrict the working distance available for iris biometric acquisition. Iris identification is valuable for verifying the identity of parties to transactions that require a high level of security, and such transactions are increasingly using smartphones and other handheld devices as an interface. However, even though it may be desirable that these smartphones be equipped to provide iris acquisition and/or identification services, the compact size, particularly the thinness of such devices places constraints on critical optical components that may be utilized for iris imaging. For example, it may be beneficial to have a short or thin camera lens, which results in a short focal length, and therefore a low magnification, which can impede the imaging of small features within the iris structure. When it is desired to perform the imaging at long distances, the camera module should have very high resolution if minute iris features are to be resolved with useful contrast. Because the resolution of small camera modules is limited, handheld iris identification users would be constrained to hold their devices closer to their face than is convenient or desirable.

In some aspects, this disclosure addresses the issue with resolution of handheld devices being lower than desired for iris recognition systems, resulting in excessively low iris feature contrast, and therefore forcing the handheld device to be positioned closer than desired to a subject's face. The International Standards Organization (ISO) has issued recommendations for optical systems used for iris identification. These include a recommendation that the pixel pitch of the imaging sensor be sufficient to cover the imaged iris with at least 100 pixels, and more preferably 150 or 200 pixels. A typical iris has a diameter of 12 mm. Therefore, it may be desired that each pixel subtend not more than 0.12 mm, or preferably 0.06 mm in some aspects.

To accommodate the above, it may be preferred that the sensor employed has a smallest possible pixel pitch. By way of illustration, the smallest pitch available may for instance be 0.00112 mm. For a lens to produce an image wherein a 0.12 mm object is imaged onto the available 0.00112 mm image pixel, the magnification M may be no less than $0.00112/0.12=0.0093$. And to image a 0.06 mm object onto a pixel, the magnification would be at least 0.019.

Furthermore, ISO also recommends that the imaging camera be able to resolve a structure or feature having a spatial frequency of 2 line pairs per millimeter (lp/mm) with a contrast, or modulation transfer function (MTF), of at least 0.6 (or 60%). The MTF of an imaging camera represents the spatial frequency response of the imaging camera. The MTF can be determined by the spatial structure and optical and electrical cross-talk of the pixels of the imaging camera. With the magnification of at least 0.0093 at the image sensor for instance, the corresponding spatial frequency is 215 lp/mm. This is another challenge for small cameras. Moreover, the sensors should work at near-IR wavelengths, typically 810 nm or 850 nm, for iris biometric acquisition. Even if it may be possible to produce lenses that meet the above specification(s) with visible light, spot spread within the image sensor due to photon scattering and carrier drift from one pixel to neighboring pixels can further reduce the effective MTF of the camera module. This scattering, sometimes referred to as crosstalk, may be much more severe at near-IR wavelengths than at visible wavelengths. In our experience, it has not been possible to find existing camera modules capable of resolving more than about 130 lp/mm with 60% MTF at near-IR wavelengths.

This limitation to camera performance can restrict the working distance available for an iris biometric system. If the indicated maximum of 130 lp/mm at the image sensor corresponds to the desired 2 lp/mm at the iris, then the magnification may be at least 0.015. If the focal length is, for example, 4 mm, then the maximum working distance may be 267 mm.

Embodiments of the present systems and methods provide a means of enabling iris identification at distances substantially longer than 23 cm, including up to and/or beyond 60 cm, at working distances that are more conducive for iris biometric acquisition. This can be without modifying the characteristics of the lens or camera modules now in employment. A difficulty with camera operation at longer distances is that the modulation transfer function at iris spatial frequencies is below desired or recommended values. This disclosure addresses this issue by indicating a means to work successfully at such reduced MTF values, even though such reduced MTF values may be below formal recommendations. Some embodiments of the present system may provide sufficient gain at the sensor for the contrast amplitude of the iris image to be greater than the standard deviation of the image signal level at the image sensor, even if the modulation transfer function of the acquired image is below recommended or desired values.

In some embodiments, algorithms used to interpret images can be based on filters, such as Gabor filters or Haar filters. These algorithms can extract from the images information based on the zero crossings of image features rather than the contrast amplitude. This process can reduce the need to maintain a high level of contrast even for small features. Provided that the image contrast is at least one bit for instance, which can be attained by applying sufficient gain at the sensor, coding of the iris features can proceed successfully. A limiting factor may be image noise, which should be at a level below the image feature contrast. Otherwise, noise contrast can be mistaken for image contrast, leading to biometric processing failure.

Noise in iris images may be dominated by shot noise. The rate at which photons arrive at each pixel on the image sensor, and generate carriers that produce the pixel signal, has at least some level of random variation. The extent of this variation may be proportional to the square root of the photon arrival rate, or to the square root of the illumination intensity. The ratio of this variability to the intensity, which is the inverse of the signal-to-noise ratio, is therefore inversely proportional to the square root of the intensity. The signal/noise ratio (S/N), is thus proportional to the square root of the intensity. A desire to achieve a low level of noise, in order to recognize features with low levels of contrast, is thus facilitated by sufficiently high levels of illumination. For instance, using exposure times of at least several milliseconds, an irradiance of at least 1.5 mW/cm$^2$ may be sufficient to acquire an image that enables good iris recognition, even when the camera module provides less than the recommended MTF at a given spatial frequency. Still greater irradiance, 3 mW/cm$^2$ or more, may improve performance or image quality.

As for illumination sources used for iris recognition, LEDs may be preferred because LEDs are available at low cost, emit at useful near-IR wavelengths including 810 nm and 850 nm, are highly efficient so as not to present an excessive power drain, and/or are small devices that are readily contained within a handheld device. A LED may provide a narrow beam of light about 10° wide at the half-maximum point, sharply peaked at the center (e.g., along the beam's directional or primary axis). At shorter distances, a LED may provide a sufficient radiant intensity, but becomes insufficient at longer distances (e.g., greater than 20 cm). Light from a LED may be sharply peaked into a narrow angle. Beyond about ±3°, the light may fall beneath a desired or sufficient irradiance (e.g., of 1.5 mW/cm$^2$). At a distance of 30 cm, the ±10° angle of a LED beam may subtend a radius of only 5.3 cm, which may be marginal for illuminating two eyes that are typically spaced 5 cm to 6 cm apart. In this scenario, in addition to being close to the device, the face should be positioned accurately within the LED beam with only about 5 cm tolerance. This is not conducive to convenient use since significant time and/or effort may be needed for accurate positioning to ensure coverage over the subject's eye(s). Successful operation would be facilitated by a much wider illumination field, with more nearly uniform illumination over a larger area with about 10 cm radius for instance.

Thus, for iris biometric acquisition and/or identification at greater distances, sufficiently high levels of illumination should be used. By way of illustration, irradiance of at least 1.5 mW/cm$^2$ (e.g., at 3 mW/cm$^2$), at distances out to 45 cm or 60 cm (from the illumination source) for example, with variation of less than 50% below the illumination source's peak irradiance (e.g., less than 30% below the peak irradiance), over a field or area with at least 7 cm radius (e.g., of 10 cm radius), can be used.

In accordance with the concepts taught in the present disclosure, the iris biometric system may employ an LED that can fit within many handheld devices (e.g., a LED that is 4.7 mm or 5.5 mm or shorter). The LED may provide radiant intensity of 6000 milliWatts per steradian (mW/sr) with 1 Ampere (A) of current excitation, and 16000 mW/sr at 3A excitation, by way of illustration. A 16000 mW/sr intensity can produce 4.4 mW/cm$^2$ irradiance at a distance of 60 cm for instance. The LED may be configured to provide a beam that is substantially uniform over a relatively wide field, e.g., dropping to 30% of its peak at about ±8°, and to 50% at about ±10°. At a distance of 60 cm for instance, the ±8° angle may cover a field of 8 cm, and the ±10° angle may cover a field of 10 cm for example. In some embodiments, the LED may be configured to provide a beam width of ±23° at 50% of full intensity, and uniform to within 30% of the peak out to ±15°. Other LEDs may be configured with a broader beam, e.g., approximately ±45°. In certain embodiments, the intensity available from a LED can be increased to a desired level by means of a supplementary lens. In some embodiments, the lens may be used for very thin devices by providing an LED assembly less than 5 mm tall. The overall handheld device or system may be less than 10 mm thick, and in some embodiments less than 5 mm thick.

In accordance with the concepts taught in the present disclosure, the illumination source may provide more than 1.5 mW/cm$^2$ irradiance in some embodiments, and in certain embodiments more than 3 mW/cm$^2$ irradiance at working distances of at least 45 cm, or at least 60 cm (e.g., from an imaging sensor and/or illumination source). The variation of irradiance from the peak may be less than 30% over fields of ±8°, or ±15°, and less than 50% over fields of ±10° or ±23°, as examples.

Figure 2A:
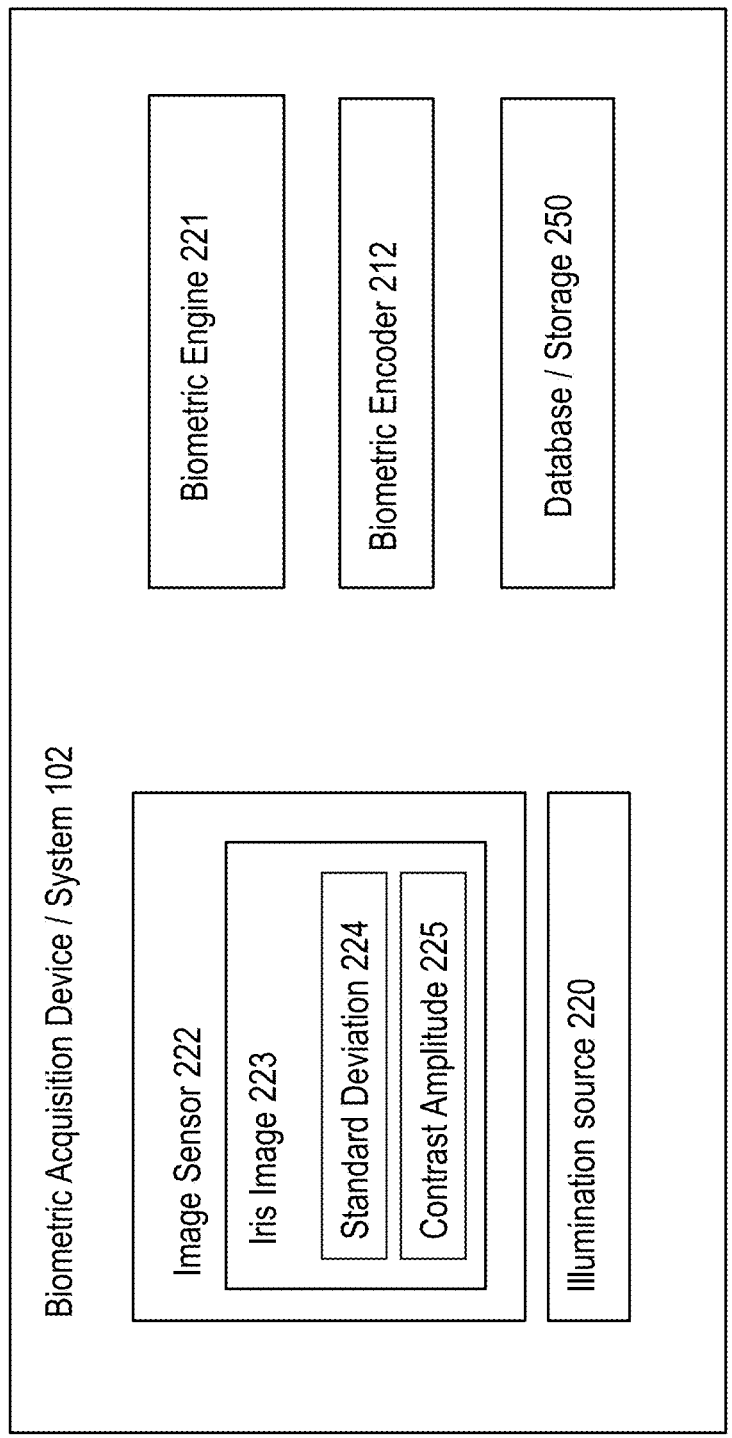
FIG. 2A is a block diagram depicting one embodiment of a system for providing illumination for iris biometric acquisition.

Referring to FIG. 2A, one embodiment of a system for providing illumination for iris biometric acquisition is depicted. In brief overview, the system may include one or more subsystems or modules, for example, one or more imaging or image sensors 222, a biometric encoder 212, and/or one or more illuminators or illuminating sources 220 for instance. The biometric acquisition device 102 may include or communicate with a database or storage device 250, and/or a biometric engine 221. For instance, the biometric acquisition device 102 may transmit a biometric template generated from an acquired iris image, to the database 250 for storage. The database 250 may incorporate one or more features of any embodiment of memory/storage elements 122, 140, as discussed above in connection with at least FIGS. 1B-1C. In some embodiments, the biometric acquisition device 102 and/or the database 250 may provide a biometric template to a biometric engine 221 for biometric matching against one or more other biometric template. In certain embodiments, the biometric acquisition device 102 does not include a database 250 and/or a biometric engine 221, but may be in communication with one or both of these.

The biometric acquisition device 102 can be a standalone device or integrated into another device. The biometric acquisition device may or may not be a mobile or portable device. The biometric acquisition device can for example correspond to, or be incorporated into a smart phone, laptop computer, tablet, watch or timepiece, eye wear, or camera, although not limited to these embodiments. The biometric acquisition device can include any feature or embodiment of a computing device 100 or client device 102 described above in connection with FIGS. 1A-1C for example.

Each of the elements, modules and/or submodules in the biometric acquisition device or system 102 is implemented in hardware, or a combination of hardware and software. For instance, each of these elements, modules and/or submodules can optionally or potentially include one or more applications, programs, libraries, scripts, tasks, services, processes or any type and form of executable instructions executing on hardware of the device 102 for example. The hardware may include one or more of circuitry and/or a processor, for example, as described above in connection with at least 1B and 1C. Each of the subsystems or modules may be controlled by, or incorporate a computing device, for example as described above in connection with FIGS. 1A-1C.

An image sensor or camera 222 may be configured to acquire iris biometrics or data, such as in the form of one or more iris images. The system may include one or more illumination sources to provide light (e.g., near infra-red or otherwise) for illuminating an iris for image acquisition. The imaging sensor 222 may comprise one or more sensor elements, and may be coupled with one or more filters (e.g., an IR-pass filter) to facilitate image acquisition. The image sensor 222 may be configured to focus on an iris and capture an iris image of suitable quality for performing iris recognition. The imaging sensor 222 may capture iris biometrics using illumination from one or more illumination sources 220, as described in this disclosure. In some embodiments, the imaging sensor 222 is also configured to acquire facial biometrics or data for biometric authentication and/or liveness detection, e.g., when illuminated with visible light or otherwise, and/or when using an IR-cut filter.

In some embodiments, an image processor of the system may operate with the image sensor 222 to locate and/or zoom in on an iris of an individual for image acquisition. In certain embodiments, an image processor may receive an iris image from the sensor 222, and may perform one or more processing steps on the iris image. For instance, the image processor may identify a region (e.g., an annular region) on the iris image occupied by the iris. The image processor may identify an outer edge or boundary, and/or an inner edge or boundary of the iris on the iris image, using any type of technique (e.g., edge and/or intensity detection, Hough transform, etc.). The image processor may segment the iris portion according to the inner (pupil) and outer (limbus) boundaries of the iris on an acquired image. In some embodiments, the image processor may detect and/or exclude some or all non-iris objects in an acquired image, such as eyelids, eyelashes and specular reflections that, if present, can occlude some portion of iris texture. The image processor may isolate and/or extract the iris portion from the image for further processing. For instance, the image processor may incorporate or use an auto-focus and/or feature detection mechanism or software to help focus on a feature, detect the feature, and/or isolate the feature on an image. The image processor can also process facial biometric images for authentication for instance.

The biometric acquisition device or system 102 may include one or a plurality of illumination sources. For example, and in some embodiments, the biometric acquisition device may have a single illuminator that is fixed or configurable relative to a position of the imaging sensor on the device. An illuminator source may have a fixed light intensity, or adjustable light intensities, and may operate in certain light wavelengths (e.g., IR or NIR, and/or in the visible spectrum). For instance, one illuminator may operate in the visible spectrum, and the same or another illuminator may operate to provide IR or NIR light. The illuminator may operate using light of wavelength(s) selected to improve detection of iris features, for example while reducing device power. One or more of the illuminators may comprise light emitting diode (LED), incandescent, fluorescent, or high-intensity discharge (HID) type light sources, or other types of light sources. One or more of the illuminators may produce or emit collimated or non-collimated light. Some of the illuminators may operate with an intensity level, wavelength, duration, power, beam/ray direction, etc., different from some other of the illuminators.

The illuminator(s) for biometric acquisition may located and/or oriented to illuminate a subject for the purpose of iris image acquisition. For instance, an illumination source may be located and/or oriented at a distance (e.g., spatial or angular) or within a distance range relative to the imaging sensor. The type(s) of illuminator on a biometric acquisition device may be configured or selected to meet predetermined requirements for liveness detection and/or iris biometric acquisition.

The illumination of the illumination source may be configured to be provided at an intensity level such that noise generated in the image sensor does not interfere with iris feature contrast in the image. The contrast in the image (e.g., contrast of light reaching the image sensor or captured at the image sensor) is related to the contrast at the iris (e.g., contrast of light reflected off the iris at the iris), the modulation transfer function (MTF) of the camera module (e.g., the combined lens and image sensor), and to the optical magnification. The contrast in the image and the MTF can depend on the finest iris spatial frequency to be recognized.

The illumination source, such as an LED emitting at near IR wavelengths, may project a beam of light onto the face of a subject. LEDs are generally rated in performance by specifying the radiant intensity $I_{LED}$, measured in W/sr, along the LED emitting or beam axis, which may be the peak value. In some embodiments, the intensity falls off away from the axis. Such a fall-off can be inconvenient for iris identification because the eyes often are positioned away from the LED axis, where the intensity can be substantially below the specified values for radiant intensity. By way of illustration and to simplify the analysis, we can use this specified peak value for following analysis.

A resulting irradiance E on an object, measured in W/cm², at a distance D may be expressed as $$E = \frac{I}{D^2}$$

In considering light reflected from the iris, if the iris albedo is $A_{iris}$, then a fraction $A_{iris}$ of the incident light is reflected diffusely, evenly distributed within a solid angle of $2\pi$ sr. The resulting radiance $L_{iris}$, in mW/cm²/sr, of light reflected by an iris at a distance $D_{iris}$ may be expressed as $$L_{iris} = \frac{A_{iris}}{2\pi} \cdot E_{iris} = \frac{A_{iris}}{2\pi} \cdot \frac{I_{LED}}{D_{iris}^2}$$

According to a principle of optics, aside from losses, the radiance from an object is preserved through an optical system and remains the same at the image. In the case of iris identification optics, there can be losses due primarily to a bandpass or long-pass filter, used to eliminate ambient illumination. Such a filter can reduce efficiency of transmitted light to 80%~90%.

Incoming photons from the transmitted light can generate charged carriers within the image sensor with a quantum efficiency of about 20%~30% at near-IR wavelengths for example. To account for the limited efficiency of the optics and the quantum efficiency of carrier generation, we can specify an overall efficiency $\eta$ for the system, with the expectation that $\eta$ is about 20% for example.

At the image sensor, a pixel can receive light reflected from the face at a radiance of $L_{sensor}$ which is reduced from the radiance at the iris by $\eta$. That is, $$L_{sensor} = \eta \cdot L_{iris} = \eta \cdot \frac{A_{iris}}{2\pi} \cdot \frac{I_{LED}}{D_{iris}^2}$$

At the sensor, a limiting solid angle $\Omega_{sensor}$ is that of the cone defined by the lens aperture. If the half-angle of this cone is $\Theta$, then the solid angle the half-angle subtends may be expressed as $$\Omega_{sensor} = 2\pi(1 - \cos\theta)$$

The f/number of the lens (f/#) is the ratio of the aperture diameter $d_{ap}$ to the focal length.
Therefore, the angle $\Theta$ can be expressed as $$f/\# = \frac{d_{ap}}{EFL} = \frac{1}{2 \cdot \tan\theta}$$

Then using the relationship $$\cos\theta = \frac{1}{\sqrt{1 + \tan^2\theta}} = \frac{1}{\sqrt{1 + \left(\frac{1}{2 \cdot f/\#}\right)^2}} = \frac{f/\#}{\sqrt{(f/\#)^2 + 0.25}}$$

we find $$\Omega_{sensor} = 2\pi\left(1 - \frac{f/\#}{\sqrt{(f/\#)^2 + 0.25}}\right)$$

The area of the pixel is $P_p^2$, where $P_p$ is the pixel pitch.

Therefore, the radiant flux $\Phi_p$, with units in W, arriving at a pixel is $$\Phi_p = L_{sensor} \cdot \Omega_{sensor} \cdot P_p^2 = \eta \cdot \frac{A_{iris}}{2\pi} \cdot \frac{I_{LED}}{D_{iris}^2} \cdot 2\pi\left(1 - \frac{f/\#}{\sqrt{(f/\#)^2 + 0.25}}\right) \cdot P_p^2$$

This formula expresses the flux of light arriving at a pixel in terms of known system parameters including the LED radiant intensity, iris albedo, iris distance, lens f/number, and optics efficiency.

In one or more embodiments, noise in iris images may be dominated by shot noise. Shot noise may comprise or correspond to random variations in the arrival rate of photons, and can be described by Poisson statistics. The variance $\sigma^2$ in a signal comprising $n_p$ photons is equal to the photon count $n_p$ itself, and the standard deviation $\sigma$ is equal to the square root of the photon count.

To estimate shot noise in an image, we determine the number of photons arriving at an image pixel during an exposure of illumination. Photons of a given wavelength $\lambda$ have an energy $J_p$ which can be expressed as $$J_p = \frac{h \cdot c}{\lambda}$$

where h is Planck's constant and c is the speed of light. The product h·c is approximately equal to $1.99 \times 10^{-23}$ J-cm.

If the radiant flux is $\Phi_p$, the number $n_p$ of photons arriving at a pixel during an exposure time $t_{exp}$ may be $$n_p = \frac{\Phi_p \cdot t_{exp}}{J_p} = \eta \cdot \frac{A_{iris} \cdot I_{LED}}{D_{iris}^2} \cdot \left(1 - \frac{f/\#}{\sqrt{(f/\#)^2 + 0.25}}\right) \cdot P_p^2 \cdot \frac{\lambda}{h \cdot c} \cdot t_{exp} \quad (1)$$

Because this process is consistent with Poisson statistics, the standard deviation $\sigma_p$ of this photon count and the signal to noise ratio are equal to the square root of this number, e.g., $$\sigma_p = S/N = \sqrt{n_p} = \sqrt{\eta \cdot \frac{A_{iris} \cdot I_{LED}}{D_{iris}^2} \cdot \left(1 - \frac{f/\#}{\sqrt{(f/\#)^2 + 0.25}}\right) \cdot P_p^2 \cdot \frac{\lambda}{h \cdot c} \cdot t_{exp}} \quad (2)$$

The contrast amplitude $C_{noise}$ of this noise, e.g., the ratio of the standard deviation $\sigma_p$ of an imaged region to the photon count $n_{pw}$ presented by a white region for which the albedo is unity, can be determined. The contrast amplitude $C_{noise}$ may be given by $$C_{noise} = \frac{\sigma_p}{n_{pw}} = \sqrt{\frac{A_{iris}}{\eta \cdot \frac{I_{LED}}{D_{iris}^2} \cdot \left(1 - \frac{f/\#}{\sqrt{(f/\#)^2 + 0.25}}\right) \cdot P_p^2 \cdot \frac{\lambda}{h \cdot c} \cdot t_{exp}}} \quad (3)$$

By way of illustration, we may insert some example values:
Efficiency η=0.20
Lens aperture f/#=2.2 (normal range may be 1.8~2.5)
Pixel pitch $P_p$=0.000112 cm (normal range may be 0.000112 cm~0.0004 cm)
Wavelength λ=0.81·10$^{-4}$ cm (normal range may be 0.75·10$^{-4}$ cm~0.94·10$^{-4}$ cm)
Product of Planck's constant and speed of light h·c=1.99·10$^{-23}$ J-cm
And for this particular example, $$n_p = (4.4 \cdot 10^9 \text{ cm}^2 \text{ sr/J}) \cdot \frac{A_{iris} \cdot I_{LED} \cdot t_{exp}}{D_{iris}^2}$$

Furthermore, the following example values may be applied:
Albedo $A_{iris}$=0.15 (normal range may be 0.09~0.25)
LED radiant intensity $I_{LED}$=1.5 W/sr (e.g., an LED with 0.5 A excitation)
Exposure $t_{exp}$=0.008 sec
Iris-camera distance $D_{iris}$=30 cm
to yield, as an example $n_p$=508 photons The noise, and the signal/noise ratio, may be obtained to be

σ=S/N=23 and the amplitude contrast of the noise may be $$C_{noise} = \frac{\sigma_p}{n_{pw}} = \frac{23}{3,386} = 0.0067$$

An object of the image acquisition is to obtain iris information. The National Institute of Science and Technology, NIST, has determined that irises have an overall albedo in the range of 0.09 to 0.25, with 0.15 being a typical value, and that the unique iris features have a contrast amplitude of a few percent over and/or under that albedo. Moreover, the feature contrast amplitude $C_{iris}$ may be a function of feature size $F_{iris}$, and may be expressed as (with $F_{iris}$ expressed in mm)

$C_{iris}$=0.04·$F_{iris}^2$+0.007   (4)

For optical systems, object structure may be considered as presenting contrast over a range of spatial frequencies, where spatial frequency may be measured in line-pairs per mm (lp/mm). A feature may be considered to be one such line. Therefore an iris feature size $F_{iris}$ in mm may correspond to a spatial frequency $SF_{iris}$ in lp/mm according to the relationship $$SF_{iris} = \frac{1}{2 \cdot F_{iris}}$$

Suppose the iris is located at a distance $D_{iris}$ from the camera, and that the lens used to create the image has a focal length EFL. Then the optical magnification M may be expressed as $$M = \frac{EFL}{D_{iris} - EFL}$$

A spatial frequency $SF_{sensor}$ at the image sensor may be related to the spatial frequency $SF_{iris}$, and to the iris feature size $F_{iris}$ iris by $$SF_{sensor} = \frac{SF_{iris}}{M} = \frac{SF_{iris} \cdot EFL}{D_i - EFL} = \frac{EFL}{(D_i - EFL) \cdot 2 \cdot F_{iris}}$$

Iris features can present a contrast $C_{sensor}$ at the image sensor equal to the product of the iris contrast and the modulation transfer function $MTF_{module}$ of the camera module:

$C_{sensor}$=$C_{iris}$·$MTF_{module}$

Both $C_{iris}$ and $MTF_{module}$ can be dependent on the spatial frequency of the features being imaged. The dependence of $C_{iris}$ on spatial frequency has been described herein. The $MTF_{module}$ may be limited by several factors including diffraction at the lens aperture, lens aberrations, defocus, crosstalk within the image sensor resulting from photon scattering and/or carrier drift. All of which may contribute to spot spreading.

Limitations to lens performance can be modeled by considering separately the modulation transfer function due to diffraction, $MTF_{diff}$, and that due to the other causes listed above such as aberrations and crosstalk, $MTF_{other}$. The lens MTF is the product of these two factors:

$MTF_{module}$=$MTF_{diff}$·$MTF_{other}$ $MTF_{diff}$ may depend on two parameters: wavelength λ and f/number (f/#), and may fall monotonically from unity at zero spatial frequency to zero at a cutoff spatial frequency, $SF_{cutoff}$, which is defined as $$SF_{cutoff} = \frac{1}{\lambda \cdot f/\#}$$

For example, if λ=850 nm and f/#=2, then $SF_{cutoff}$=588 lp/mm.

It may be helpful to define a normalized spatial frequency β

$$\beta = \frac{SF_{sensor}}{SF_{cutoff}} = \lambda \cdot f/\# \cdot SF_{sensor} = \frac{EFL}{(D_i - EFL) \cdot 2 \cdot F_{iris}} \quad (5)$$

so that all interesting spatial frequencies may be included in value of β between 0 and 1. The diffraction contribution to MTF can take the form $$MTF_{diff} = \frac{2}{\pi}\left[\cos^{-1}(\beta) - \beta \cdot \sqrt{1 - \beta^2}\right]$$

Aberrations express the imperfect focusing by the lens, causing what would have been an infinitesimally small spot to acquire some size we call spot spread. The contribution of the lens aberration and other sources of spot spread to MTF can also be expressed as a function of β. A model that includes the key features of the phenomenon to a good approximation is the equation $$MTF_{other} = 1 - [1 - 4(\beta - 0.5)^2] \cdot \left(\frac{W}{0.18}\right)^2$$

where W (wavefront error) is a measure of the size of the spot. The diffraction and aberration factors can combine to form the camera module MTF:

$$MTF_{module} = MTF_{diff} \cdot MTF_{other} \quad (6)$$

$$= \frac{2}{\pi} \cdot [\cos^{-1}(\beta) - \beta \cdot \sqrt{1-\beta^2}] \cdot$$

$$\left[1 - (1 - 4(\beta - 0.5)^2) \cdot \left(\frac{W}{0.18}\right)^2\right]$$

Figure 2B:
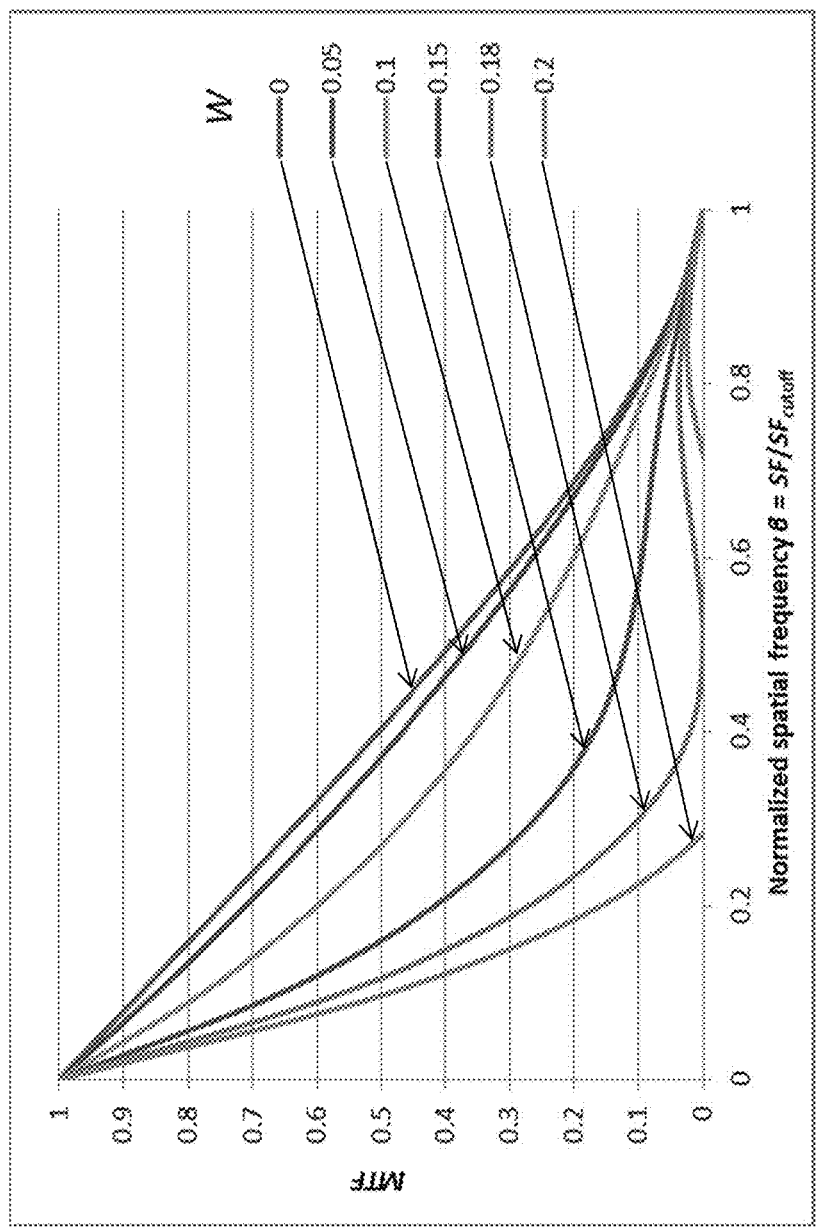
FIGS. 2B and 2C are diagrams depicting example graphs of modulation transfer function of a camera module.

This relationship is depicted in FIG. 2B, in one example embodiment. MTF curves for combined diffraction and aberration effects for various values of W, in units of normalized spatial frequency β, are shown. The curve for W=0 is the diffraction contribution. As W increases, the MTF droops below the diffraction limit. At W=0.18 it reaches zero at β=0.5. For W>0.18, the MTF becomes negative for some values of β. Such negative values can be ignored.

For a well-designed lens, and if the image sensor pixels are small (e.g., 1.12 μm), spot spread from imager sensor crosstalk may tend to dominate that from lens aberrations. If the lens is defocused, then spot spread from defocus can tend to dominate that from crosstalk and aberrations. However, for this analysis it may not have to consider the matter of defocus; we can consider the case of a focused image where crosstalk and aberration spot spread combines with diffraction spot spread to limit resolution in a focused image.

Image sensor manufacturers generally do not publish specifications for crosstalk. In measuring MTF limitations by image sensors, it is found that for a high-quality lens with an f/2.0 aperture and illumination at near-IR wavelengths of about 850 nm (=0.00085 mm), the module MTF is 50% at spatial frequencies between 90 lp/mm and 130 lp/mm, depending on the particular sensor. These measurements allow us to estimate the values of W for these systems. First, in solving Eqn. (6) for W:

$$W = 0.18 \cdot \sqrt{\frac{\cos^{-1}(\beta) - \beta \cdot \sqrt{1-\beta^2} - \frac{\pi}{2} \cdot MTF_{module}}{[1 - 4(\beta - 0.5)^2] \cdot [\cos^{-1}(\beta) - \beta \cdot \sqrt{1-\beta^2}]}} \quad (7)$$

Figure 2C:
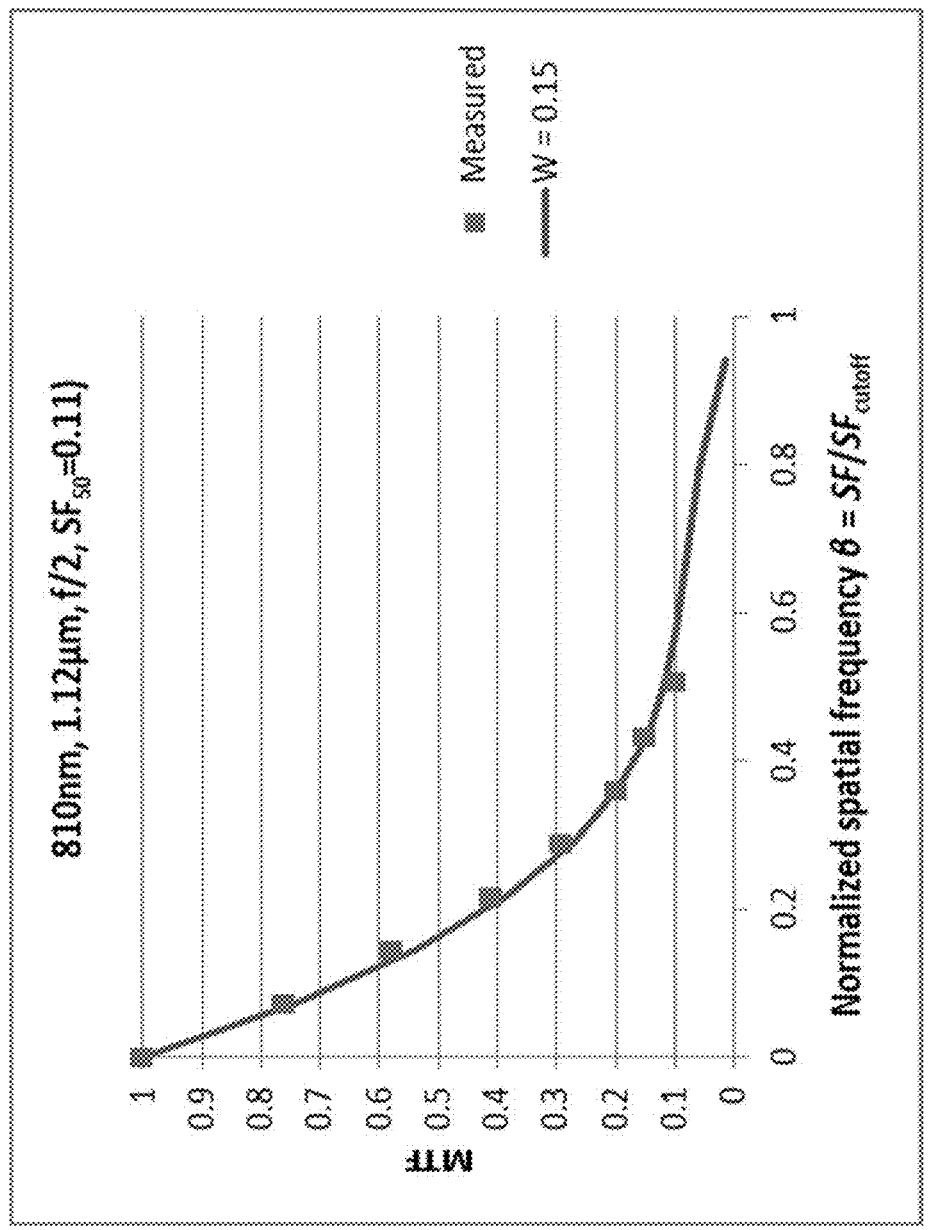

For example, if the spatial frequency where $MTF_{module}$=0.5 is 100 lp/mm at a wavelength of 810 nm, then β=0.00081·2·100=0.16, and W=0.15. The MTF plot that results from inserting the Eqn. (7) value of W into Eqn. (6) is shown as an example embodiment in FIG. 2C. Also shown are MTF data points measured on a camera module with the above illustrative characteristics, indicating general agreement between the model and real data.

This method can be used to estimate the image contrast as a function of feature size for any particular lens system, given a measurement of the spatial frequency where the MTF=0.5 (or any other value, such as MTF=0.3 for instance):

$$C_{sensor} = C_{iris} \cdot MTF_{module} \quad (8)$$

$$= [0.04 \cdot F_{iris}^2 + 0.007] \cdot \frac{2}{\pi} \cdot [\cos^{-1}(\beta) - \beta \cdot \sqrt{1-\beta^2}] \cdot$$

$$\left[1 - [1 - 4(\beta - 0.5)^2] \cdot \left(\frac{W}{0.18}\right)^2\right]$$

with β given by Eqn. (5). Eqn. (8) indicates the contrast at the image sensor due to iris structure of a particular feature size as a function of system parameters including the distance between the iris and the camera, the camera lens focal length, and the spatial frequency at which the camera module has some particular MTF.

For contrast at the image sensor due to iris structure to be recognized, its amplitude (sometimes referred to as contrast amplitude) should be greater than that of the noise. That is, $$C_{sensor} \geq C_{noise}$$

Here we compare the signal contrast to the noise contrast in order to discover conditions under which the signal contrast is expected to be greater than the noise contrast, and thereby conducive to good operation.

Considering the conditions under which iris recognition using a handheld device may be performed, the handheld device may include an image sensor (or camera module) and illumination source with the following example features:

EFL≈4.3 mm
Aperture≈f/2.2
Sensor pixel pitch $P_p$≈0.00112 mm
Illumination wavelength λ≈810 nm
Peak rated illuminator drive current=0.5 A
Peak LED radiant intensity $I_{LED}$≈1.5 W/sr An assumption is that the overall system efficiency, accounting inter alia for sensor quantum efficiency and IR filter absorption, is 20%. As noted, h·c=1.99·10$^{-23}$ J·cm. By way of example, an exposure time may be about 0.008 sec, an iris albedo value may be 0.15, and the camera module MTF may be 50% at a spatial frequency of 100 lp/mm. Also assume a distance between the sensor and the iris ($D_{iris}$) is 26 cm. With these example values inserted into Eqns. (1) and (2) to evaluate the expected system noise and iris feature contrast, we have:

$$n_p = \eta \cdot \frac{A_{iris} \cdot I_{LED}}{D_{iris}^2} \cdot \left(1 - \frac{f/\#}{\sqrt{(f/\#)^2 + 0.25}}\right) \cdot P_p^2 \cdot \frac{\lambda}{h \cdot c} \cdot t_{exp} =$$

677 photons/pixel $$\sigma_p = S/N = \sqrt{\eta \cdot \frac{A_{iris} \cdot I_{LED}}{D_{iris}^2} \cdot \left(1 - \frac{f/\#}{\sqrt{(f/\#)^2 + 0.25}}\right) \cdot P_p^2 \cdot \frac{\lambda}{h \cdot c} \cdot t_{exp}} = 26$$

Figure 2D:
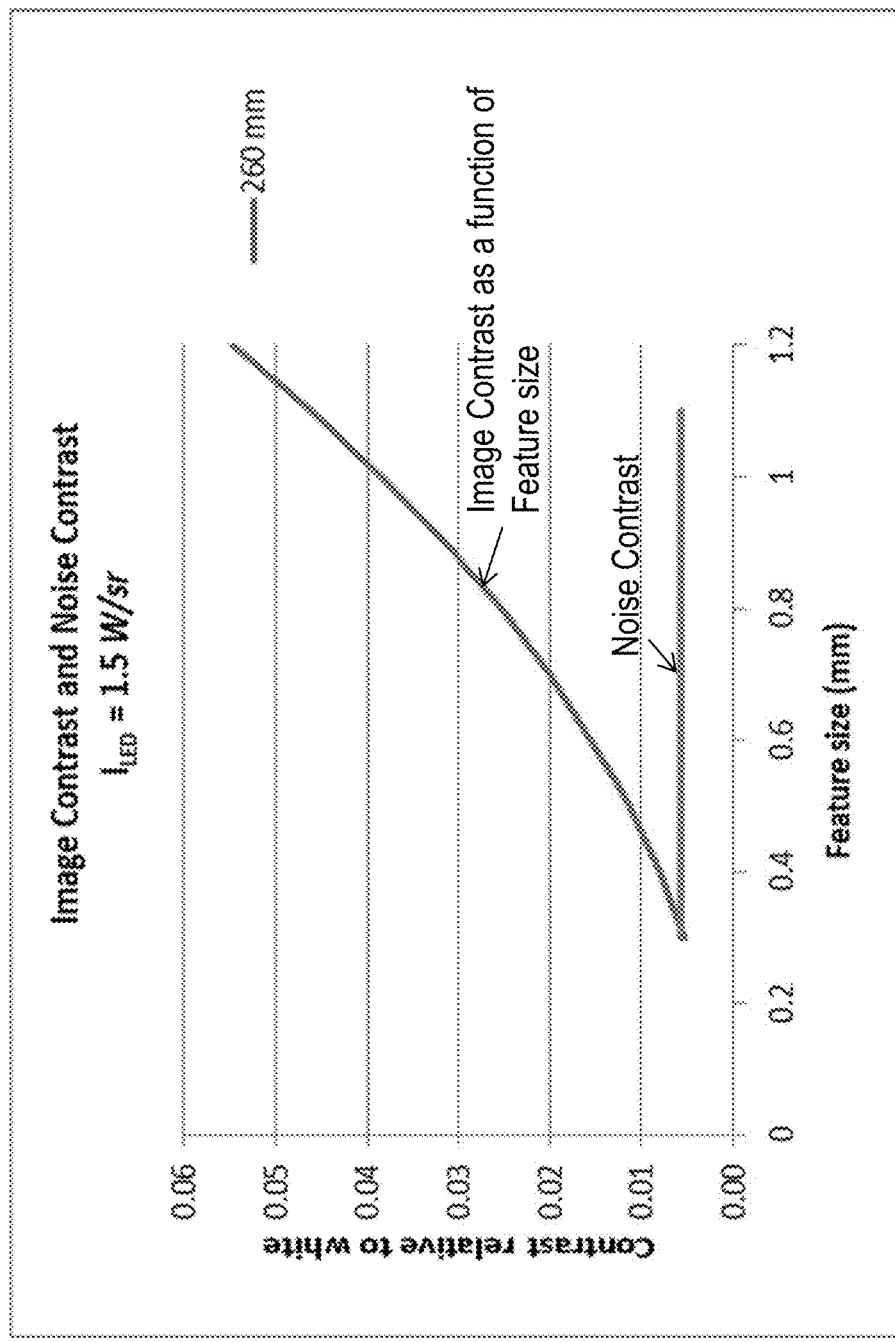
FIGS. 2D-2G are diagrams depicting example graphs of feature contrast and noise contrast under various conditions.

The number of photons/pixel for a white object (A=1) may be noted to be 4,516. Therefore the noise contrast level (also sometimes referred to as standard deviation of image signal level due to noise) can be 26/4516=0.0058. Eqn. (8) can be used to determine the feature contrast for feature sizes of 0.3 mm through 1.1 mm. The results are depicted in FIG. 2D, in one example embodiment. The curved line is the image contrast $C_{sensor}$ as a function of feature size from Eqn. (8) and the flat line is the noise contrast $C_{noise}$ from Eqn. (3). From this curve, it can be seen that the feature contrast remains at or above the noise contrast for all feature sizes, leading to the expectation that iris identification will be supported by the optical system.

Figure 2E:
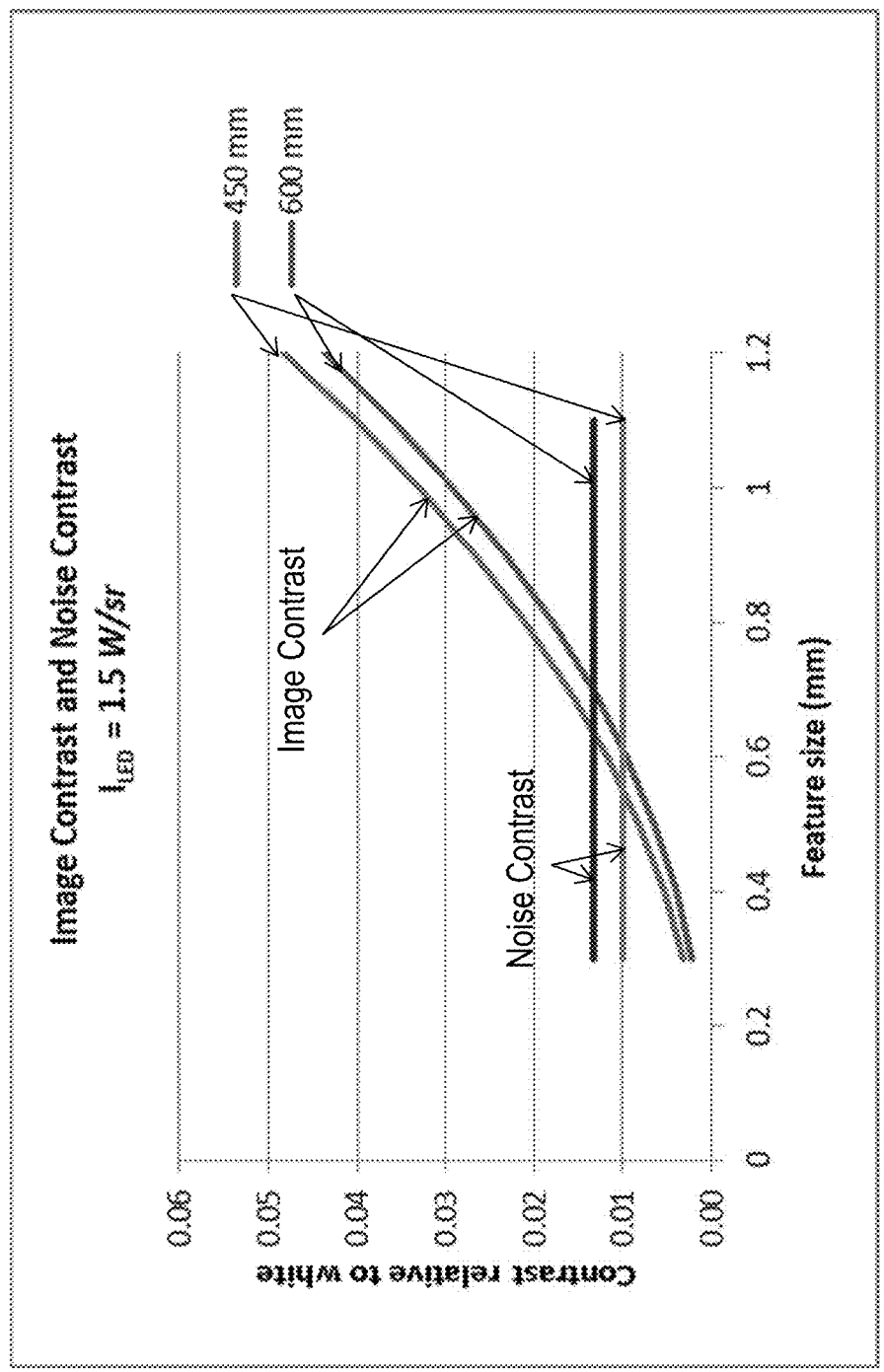

The following analysis illustrates a result of attempts to extend the iris distance to, for example 45 cm or 60 cm. Substituting in the values for $D_{iris}$, and leaving all other values unchanged, we get the result of FIG. 2E. Iris feature contrast, also sometimes referred to as contrast amplitude (curved lines), and noise contrast or standard deviation (flat lines), are shown relative to each other. In these cases, the feature contrast drops below the noise contrast for feature sizes of about 0.56 mm at 45 cm distance (curves for 450 mm) and about 0.69 mm for 60 cm distance (curves for 600 mm). Therefore, much of the feature contrast may be lost in the noise at these distances, and such a system would not be expected to function properly.

Figure 2F:
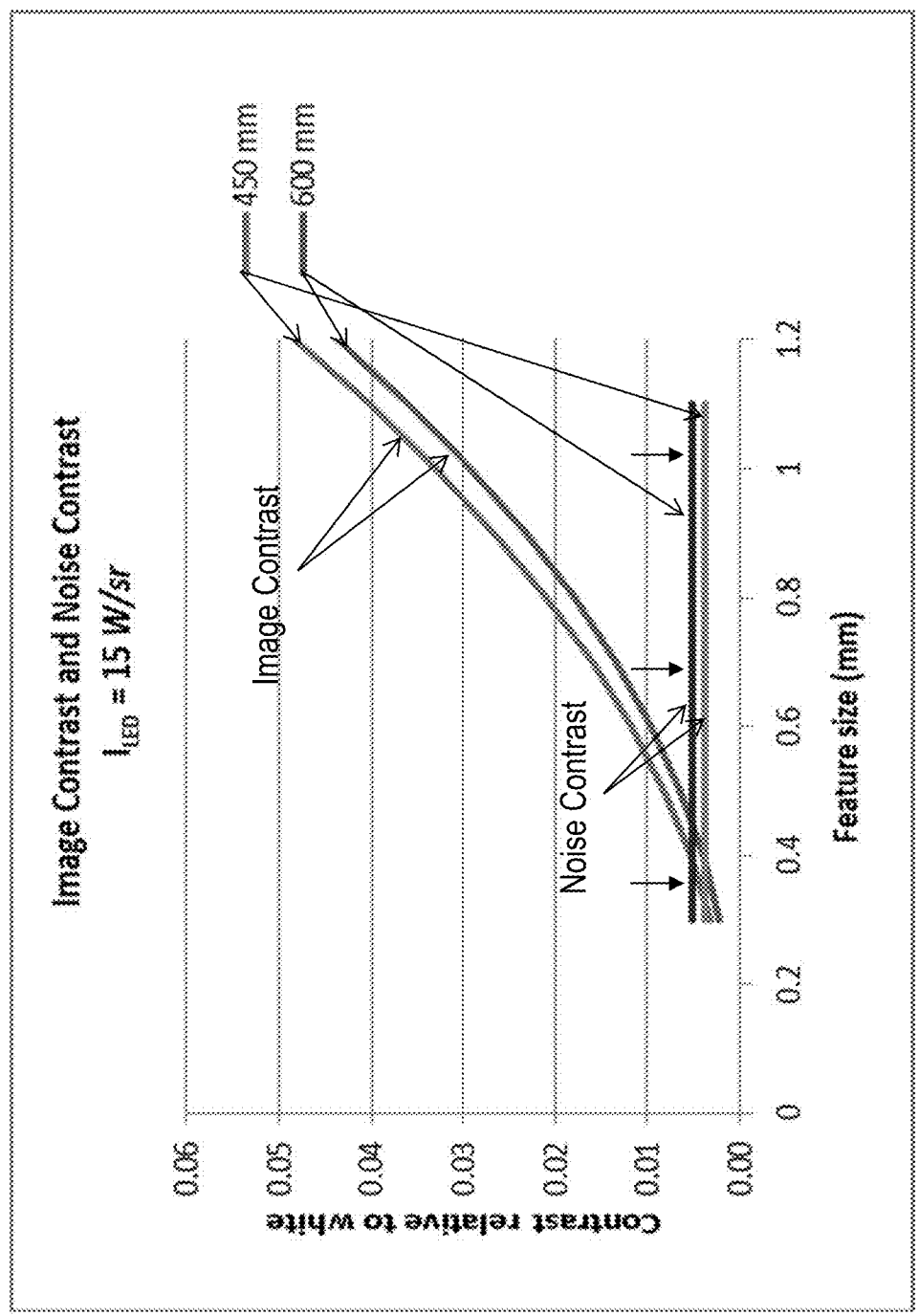

The present disclosure provides a remedy to have the feature contrast exceed noise contrast at large distances (e.g., more than 30 cm). The level of noise contrast may be reduced (e.g., as shown by the vertical arrows) by increasing the illumination, even though feature contrast may remain unchanged by the increased illumination. For example, using illumination with a radiant intensity of 15 W/sr, feature contrast and noise contrast curves as shown in FIG. 2F may be achieved. As compared with FIG. 2E, the feature contrast lines for 45 cm and 60 cm distances respectively are essentially unchanged. At 45 cm distance the feature contrast is above the noise contrast for almost all feature sizes of interest, and at 60 cm distance the feature contrast is above the noise contrast for 0.40 mm features and larger. The loss of contrast for features smaller than 0.40 mm, while undesirable, may not preclude satisfactory iris authentication.

Figure 2G:
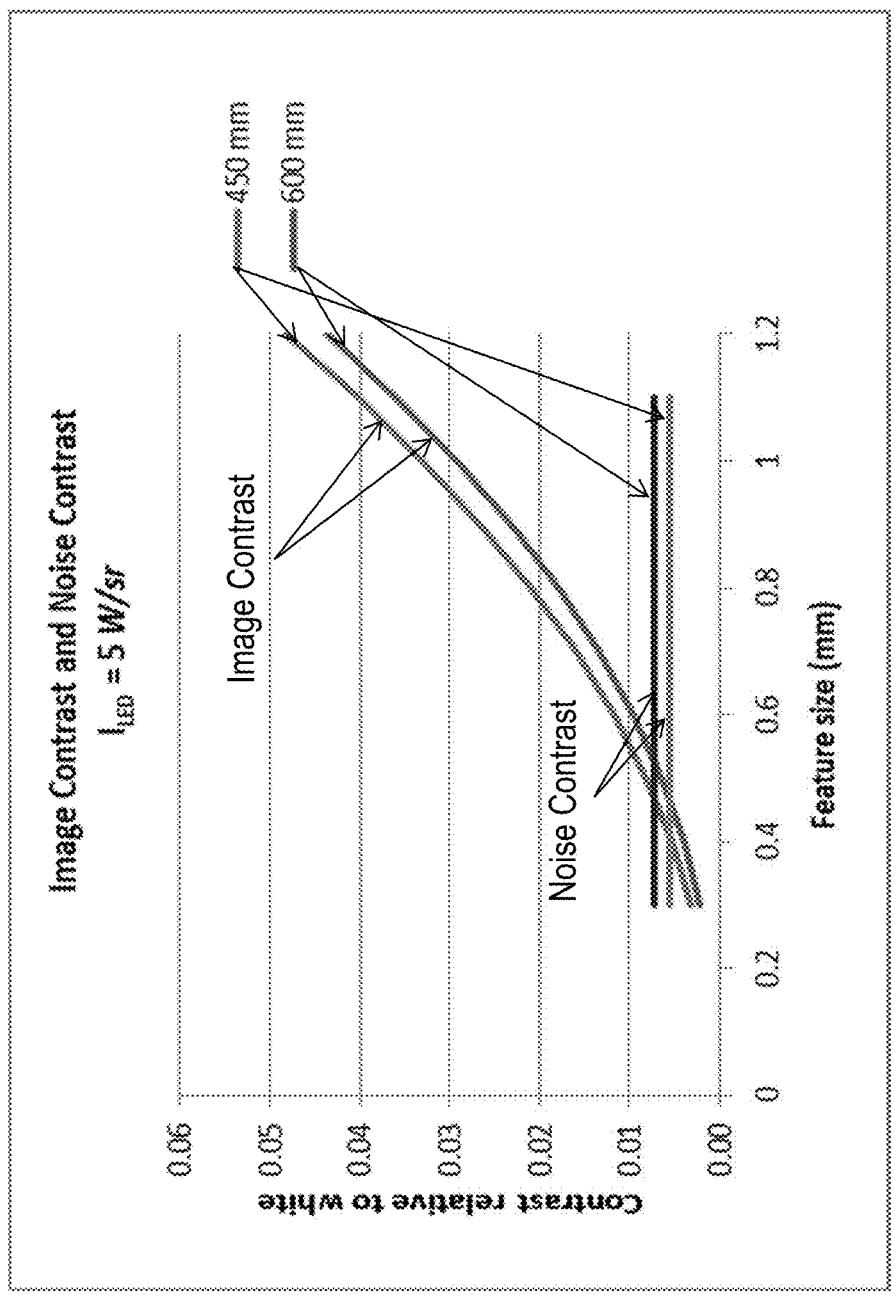

FIG. 2G depicts an example chart of iris and noise contrast at 45 cm and 60 cm distances for a lower radiant intensity (e.g., 5 W/sr). At 45 cm, the signal is above the noise for features larger than 0.41 mm and, at 60 cm, for features larger than 0.53 mm, showing performance improved over that with 1.5 W/sr. Alternatively or additionally, system changes can enable noise contrast to be below feature contrast at larger separations (e.g., at 60 cm) using techniques such as using a larger aperture or longer focal length lens.

Figure 2H:
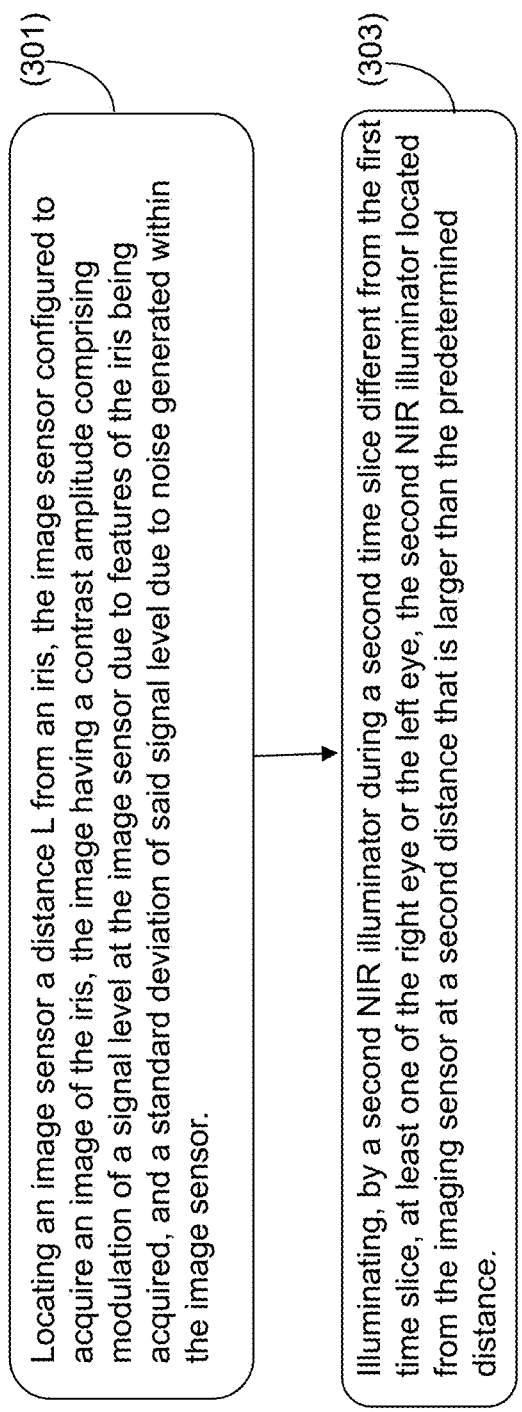
FIG. 2H is a flow diagram depicting one embodiment of a method for providing illumination for iris biometric acquisition.

Referring now to FIG. 2H, one embodiment of a method for providing illumination for iris biometric acquisition is depicted. The method may include locating an image sensor a distance L from an iris (301). The image sensor may be configured to acquire an image of the iris. The image may have a contrast amplitude comprising modulation of a signal level at the image sensor due to features of the iris being acquired, and may have a standard deviation of said signal level due to noise generated within the image sensor. An illumination source may provide infrared illumination during acquisition of the image (303). When L is set at a value of at least 30 centimeters, the illumination source may provide the infrared illumination to the iris at a first irradiance value, quantified in watts per centimeter-squared, such that the contrast amplitude is at a value above that of the standard deviation, and enables the acquired image to be used for biometric recognition.

Referring now to (301), and in some embodiments, an image sensor is located a distance L from an iris. The image sensor may be configured to acquire an image of the iris. The image sensor may be configured and/or oriented to receive infrared illumination reflected from the iris. The image may have a contrast amplitude comprising modulation of a signal level at the image sensor due to features of the iris being acquired, and may have a standard deviation of said signal level due to noise generated within the image sensor. The modulation of the signal level is due to the features of the iris. The iris provides a signal that includes an average level due to the albedo or reflected light, and a modulation of that level due to iris features. The contrast amplitude may comprise or correspond to the amplitude of the modulation of the signal level.

The standard deviation of said signal level may be due to shot noise generated within the image sensor. The standard deviation may correspond to the modulation of the signal level due to noise. Shot noise may comprise or correspond to random variations in the arrival rate of photons. The standard deviation and/or the contrast amplitude may each be already normalized with the photon count presented by a white region for which the albedo is unity. For instance, the standard deviation of the signal level (or of carrier count generated by photons) in the acquired image, may be expressed as a fraction of the signal level from a white object, and contrast amplitude may be expressed as a fraction of the signal level from a white object.

The image sensor may have a resolution that is lower than desired or specified (e.g., by the ISO recommendations) for iris biometric acquisition/recognition systems. The image sensor may be limited or constrained in resolution due to the image sensor's corresponding dimensions (e.g., for fitting onto a compact user device). The image sensor may be subject to, or suffer from spot spread within the image sensor due to photon scattering and/or carrier drift from one pixel to neighboring pixels. The modulation transfer function (MTF) of an image acquired by the image sensor may be below the specified or desired values.

Referring to (303) and in some embodiments, an illumination source may provide infrared illumination during acquisition of the image. In some embodiments, the illumination source includes a light emitting diode (LED). The image sensor and the illumination source may be incorporated on a user device, such as a mobile, handheld and/or compact device. The user device may comprise a device that has a thickness requirement (e.g., of less than 9 mm, 5 mm or some other value), such as a smartphone device for example.

When L is set at a value of at least 30 centimeters for example, the illumination source may provide the infrared illumination to the iris at a first irradiance value, to cause the contrast amplitude is at a value above that of the standard deviation, and enable the acquired image to be used for biometric recognition. L may be set or adjusted to any distance value, manually or otherwise. L may be set or adjusted to 35 cm, 40 cm, 45 cm, 50 cm, 55 cm, 60 cm, 65 cm or greater, for instance. The first irradiance value may be quantified in any suitable units consistent with the standard deviation for instance, such as watts per centimeter-squared. The first irradiance value can be preconfigured or adjusted such that the contrast amplitude is at a value above that of the standard deviation.

In some embodiments, the image sensor and/or the illumination source provides sufficient intensity or irradiance at the image sensor for the contrast amplitude of the iris image to be greater than the standard deviation of the image signal level at the image sensor, even if the modulation transfer function of the acquired image is below specified or desired values. In one or more embodiments, increasing the illumination increases the noise and/or the standard deviation, and increases the contrast amplitude by a larger extent relative to the noise and/or the standard deviation. In some embodiments, the illumination source is configured to set or adjust the irradiance of the infrared illumination at value(s) that causes the contrast amplitude of the iris image to be greater than the standard deviation of the image signal level at the image sensor.

In some embodiments, the illumination source is configured to adjust or increase the irradiance of the infrared illumination at value(s) that causes the contrast amplitude of the iris image to be greater than the standard deviation. For example, the contrast amplitude may essentially be unchanged at a given distance L with the change in the irradiance, and the standard deviation may be reduced or lowered with the change in the irradiance. The illumination source may be configured to set or adjust the irradiance of the infrared illumination at value(s) to cause the contrast amplitude of iris features of at least a predetermined size (e.g., corresponding to 1 lp/mm or 2 lp/mm), to be greater than the standard deviation. The illumination source may increase the illumination to reduce the standard deviation relative to the signal level, without reducing contrast amplitude relative to the same signal level.

Alternatively or in addition, the system that incorporates the image sensor and illumination source can enable or cause the standard deviation to be below the contrast amplitude for a given iris feature size at a separation distance to the iris that is greater than 30 cm (e.g., at 60 cm) using one or more of: a larger aperture or a supplementary lens (e.g., a longer focal length lens).

In some embodiments, the illumination source provides the infrared illumination at irradiance values with a variation of less than 50% below a corresponding peak irradiance value, at distances out to 45 or 60 centimeters, over an illumination field of at least ±23 degrees. The illumination source can provide infrared illumination at irradiance values with a variation of less than 50% below a corresponding peak irradiance value, at distances out to 45 or 60 centimeters, over an illumination field of at least ±10 degrees. The illumination source can provide infrared illumination at irradiance values of at least 0.0015 watts per centimeter-squared at distances out to 45 or 60 centimeters. The illumination source can provide infrared illumination at irradiance values of at least 0.0015 watts per centimeter-squared at distances out to 45 or 60 centimeters, over an area with at least a radius of 5 centimeters. The illumination source can provide infrared illumination at irradiance values of at least 0.0015 watts per centimeter-squared at distances out to 45 or 60 centimeters, over an area with at least a radius of 10 centimeters.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A system for imaging an iris for biometric recognition, the system comprising:
   an image sensor located a distance L from an iris, the image sensor configured to acquire an image of the iris, the image having a contrast amplitude comprising modulation of a signal level at the image sensor due to features of the iris being acquired, and a standard deviation of said signal level due to noise generated within the image sensor; and
   an illumination source configured to provide infrared illumination during acquisition of the image, wherein when L is set at a value of at least 30 centimeters, the illumination source is configured to provide the infrared illumination to the iris at a first irradiance value, such that the contrast amplitude is at a value above that of the standard deviation, and enables the acquired image to be used for biometric recognition.

2. The system of claim 1, wherein the illumination source is configured to provide the infrared illumination at irradiance values with a variation of less than 50% below a corresponding peak irradiance value, at distances out to 60 centimeters, over an illumination field of at least ±23 degrees.

3. The system of claim 1, wherein the illumination source is configured to provide the infrared illumination at irradiance values with a variation of less than 50% below a corresponding peak irradiance value, at distances out to 60 centimeters, over an illumination field of at least ±10 degrees.

4. The system of claim 1, wherein the illumination source is configured to provide the infrared illumination at irradiance values of at least 0.0015 watts per centimeter-squared at distances out to 60 centimeters.

5. The system of claim 4, wherein the illumination source is configured to provide the infrared illumination at irradiance values of at least 0.0015 watts per centimeter-squared at distances out to 60 centimeters, over an area with at least a radius of 5 centimeters.

6. The system of claim 4, wherein the illumination source is configured to provide the infrared illumination at irradiance values of at least 0.0015 watts per centimeter-squared at distances out to 60 centimeters, over an area with at least a radius of 10 centimeters.

7. The system of claim 1, wherein the illumination source comprises a light emitting diode (LED).

8. The system of claim 1, wherein the image sensor and the illumination source are incorporated on a user device.

9. The system of claim 1, wherein the standard deviation of said signal level is due to shot noise generated within the image sensor.

10. The system of claim 1, wherein the first irradiance value is preconfigured or adjusted such that the contrast amplitude is at a value above that of the standard deviation.

11. A method for imaging an iris for biometric recognition, the method comprising:
    locating an image sensor a distance L from an iris, the image sensor configured to acquire an image of the iris, the image having a contrast amplitude comprising modulation of a signal level at the image sensor due to features of the iris being acquired, and a standard deviation of said signal level due to noise generated within the image sensor; and providing, by an illumination source, infrared illumination during acquisition of the image, wherein when L is set at a value of at least 30 centimeters, the illumination source is configured to provide the infrared illumination to the iris at a first irradiance value, such that the contrast amplitude is at a value above that of the standard deviation, and enables the acquired image to be used for biometric recognition.

12. The method of claim 11, further comprising providing the infrared illumination at irradiance values with a variation of less than 50% below a corresponding peak irradiance value, at distances out to 60 centimeters, over an illumination field of at least ±23 degrees.

13. The method of claim 11, further comprising providing the infrared illumination at irradiance values with a variation of less than 50% below a corresponding peak irradiance value, at distances out to 60 centimeters, over an illumination field of at least ±10 degrees.

14. The method of claim 11, further comprising providing the infrared illumination at irradiance values of at least 0.0015 watts per centimeter-squared at distances out to 60 centimeters.

15. The method of claim 14, further comprising providing the infrared illumination at irradiance values of at least 0.0015 watts per centimeter-squared at distances out to 60 centimeters, over an area with at least a radius of 5 centimeters.

16. The method of claim 14, further comprising providing the infrared illumination at irradiance values of at least 0.0015 watts per centimeter-squared at distances out to 60 centimeters, over an area with at least a radius of 10 centimeters.

17. The method of claim 11, wherein the illumination source comprises a light emitting diode (LED).

18. The method of claim 11, wherein the image sensor and the illumination source are incorporated on a user device.

19. The method of claim 11, wherein the standard deviation of said signal level is due to shot noise generated within the image sensor.

20. The method of claim 11, wherein the first irradiance value is preconfigured or adjusted such that the contrast amplitude is at a value above that of the standard deviation.

* * * * *